(12) United States Patent
Komatsuzaki et al.

(10) Patent No.: US 10,647,872 B2
(45) Date of Patent: May 12, 2020

(54) MOISTURE-PERMEABLE FILM

(71) Applicant: DIC Corporation, Tokyo (JP)

(72) Inventors: Kunihiko Komatsuzaki, Osaka (JP); Tetsuo Takada, Chiba (JP)

(73) Assignee: DIC CORPORATION, Tokyo (JP)

( * ) Notice: Subject to any disclaimer, the term of this patent is extended or adjusted under 35 U.S.C. 154(b) by 70 days.

(21) Appl. No.: 15/762,440

(22) PCT Filed: Jul. 28, 2016

(86) PCT No.: PCT/JP2016/072145
§ 371 (c)(1),
(2) Date: Mar. 22, 2018

(87) PCT Pub. No.: WO2017/051604
PCT Pub. Date: Mar. 30, 2017

(65) Prior Publication Data
US 2018/0265733 A1 Sep. 20, 2018

(30) Foreign Application Priority Data

Sep. 25, 2015 (JP) ................. 2015-188255

(51) Int. Cl.
| C09D 133/26 | (2006.01) |
| C08F 220/54 | (2006.01) |
| C08L 33/24 | (2006.01) |
| C08L 75/04 | (2006.01) |
| C08L 75/06 | (2006.01) |
| C08L 33/26 | (2006.01) |
| C09D 175/04 | (2006.01) |
| C09D 175/08 | (2006.01) |
| C08L 75/08 | (2006.01) |
| C09D 175/06 | (2006.01) |
| C08F 220/28 | (2006.01) |
| C09D 133/14 | (2006.01) |

(52) U.S. Cl.
CPC .......... *C09D 133/26* (2013.01); *C08F 220/28* (2013.01); *C08F 220/54* (2013.01); *C08L 33/24* (2013.01); *C08L 33/26* (2013.01); *C08L 75/04* (2013.01); *C08L 75/06* (2013.01); *C08L 75/08* (2013.01); *C09D 133/14* (2013.01); *C09D 175/04* (2013.01); *C09D 175/06* (2013.01); *C09D 175/08* (2013.01); *C08F 220/286* (2020.02)

(58) Field of Classification Search
CPC .......... C08L 75/08; C08L 75/06; C08L 33/24; C08L 33/14; C09D 175/08; C09D 175/06; C09D 175/04; C09D 133/26; C09D 133/14; C08F 2220/286; C08F 216/18
See application file for complete search history.

(56) References Cited

U.S. PATENT DOCUMENTS

| 4,228,205 A | * | 10/1980 | Hudecek | ................... C08L 9/02 252/194 |
| 4,871,812 A | * | 10/1989 | Lucast | ................. C09J 133/062 525/186 |
| 5,019,100 A | * | 5/1991 | Hennink | ............. D06M 15/263 351/159.33 |
| 5,183,504 A | * | 2/1993 | Kuwajima | ......... C08G 18/0823 106/404 |
| 5,471,285 A | * | 11/1995 | Nagase | ............. G03G 15/0233 361/225 |
| 5,648,166 A | * | 7/1997 | Dunshee | ................. A61L 15/58 428/355 AC |
| 5,739,194 A | * | 4/1998 | Natesh | ................ C08F 283/006 524/457 |
| 6,545,083 B1 | * | 4/2003 | Hirata | ................. C08F 290/062 524/556 |
| 2012/0207998 A1 | * | 8/2012 | Ando | ...................... E04B 1/644 428/220 |

(Continued)

FOREIGN PATENT DOCUMENTS

| JP | S47-013326 A | 7/1972 |
| JP | S49-044038 A | 4/1974 |
| JP | S50-092348 A | 7/1975 |

(Continued)

OTHER PUBLICATIONS

Machine Translation of JP 2001192551 (Year: 2019).*
Machine Translation of JP 2003335873 (Year: 2019).*
Search Report issued in corresponding European Application No. 16848394.9, dated Apr. 30, 2019.
Search Report issued in corresponding International Patent Application No. PCT/JP2016/072145, dated Sep. 6, 2016.

*Primary Examiner* — Michael M Dollinger
(74) *Attorney, Agent, or Firm* — McDermott Will & Emery LLP

(57) ABSTRACT

A problem to be solved by the present invention is to provide a moisture-permeable film which is excellent in moisture permeability and water swelling resistance. The present invention relates to a moisture-permeable film formed by a composition containing polyurethane (A) and a hydrophilic acrylic polymer (B). The moisture-permeable film of the present invention is excellent in the moisture permeability and the water swelling resistance. Accordingly, the moisture-permeable film of the present invention can be preferably used as the moisture-permeable film used in producing moisture-permeable waterproof cloth for clothing, medical, and hygiene; and synthetic leather. The hydrophilic acrylic polymer (B) is preferably a polymer of a hydrophilic acrylic monomer (b1) containing an acrylic monomer (b1-1) having an amide group and an acrylic monomer (b1-2) having an oxyethylene group.

3 Claims, No Drawings

(56) References Cited

U.S. PATENT DOCUMENTS

2017/0282512 A1* 10/2017 Kano ..................... B32B 27/30

FOREIGN PATENT DOCUMENTS

| JP | 2000-017034 A | | 1/2000 |
|---|---|---|---|
| JP | 2001-192551 A | | 7/2001 |
| JP | 2003041482 A | * | 2/2003 |
| JP | 2003-335873 A | | 11/2003 |
| JP | 2004-162056 A | | 6/2004 |
| JP | 2005-264152 A | | 9/2005 |
| JP | 2014-030863 A | | 2/2014 |
| JP | 2015-086366 A | | 5/2015 |

* cited by examiner

MOISTURE-PERMEABLE FILM

CROSS REFERENCE

This application is the U.S. National Phase under 35 U.S.C. § 371 of International Application No. PCT/JP2016/072145, filed on Jul. 28, 2016, which claims the benefit of Japanese Application No. 2015-188255, filed on Sep. 25, 2015, the entire contents of each are hereby incorporated by reference.

TECHNICAL FIELD

The present invention relates to a moisture-permeable film excellent in moisture permeability and water swelling resistance.

BACKGROUND ART

Since polyurethane has excellent mechanical strength and elasticity, polyurethane has been widely used in various fields such as a coating agent, a molding material, a coating material, and an optical film, and has been also actively researched as a material for moisture-permeable waterproof cloth or synthetic leather.

However, synthetic leather coated with polyurethane was inferior in the moisture permeability, and thus there was a disadvantage of becoming musty when being worn. Therefore, as a method for solving this disadvantage, a method for wet-solidifying a polyurethane resin solution to make it porous has been proposed (for example, refer to PTL 1). However, in order to wet-solidify, it was necessary to include special equipment and a complicated processing process.

On the other hand, a hydrophilic urethane film applicable to a dry lamination method has been proposed as a method being easy in processing (for example, refer to PTL 2). However, this hydrophilic urethane film is prepared by a method of using polyoxyethylene glycol having high water absorption as a main component, and thus there is a problem in that the film swells due to water contact at the time of actual use, whereby appearance change and peeling from a base material are caused. Further, due to the high concentration of an ether group, light resistance, heat resistance, and the like are inferior, thereby providing a problem of having difficulty in expanding to furniture and vehicle applications required for durability.

CITATION LIST

Patent Literature

[PTL 1] JP-A-2014-30863
[PTL 2] JP-A-2005-264152

SUMMARY OF INVENTION

Technical Problem

A problem to be solved by the present invention is to provide a moisture-permeable film which is excellent in moisture permeability and water swelling resistance.

Solution to Problem

The present invention relates to a moisture-permeable film formed by a composition containing polyurethane (A) and a hydrophilic acrylic polymer (B).

Advantageous Effects of Invention

The moisture-permeable film of the present invention is excellent in the moisture permeability and the water swelling resistance. Accordingly, the moisture-permeable film of the present invention can be preferably used as moisture-permeable films useful in producing moisture-permeable waterproof cloth for clothing, medical, and hygiene; and synthetic leather.

DESCRIPTION OF EMBODIMENTS

The moisture-permeable film of the present invention is formed by a composition containing polyurethane (A) and a hydrophilic acrylic polymer (B).

In the present invention, in order to obtain excellent moisture permeability and water swelling resistance, it is essential to use the hydrophilic acrylic polymer (B). Since excellent moisture permeability and water swelling resistance are imparted by the hydrophilic acrylic polymer (B), it is very easy to design other physical properties such as durability without limiting to the kind of polyol which is a raw material of the polyurethane (A).

Note that, in the present invention, "hydrophilicity" of the hydrophilic acrylic polymer (B) means affinity with water, and specifically, means that the solubility is preferably 5% by mass or more, is more preferably 10% by mass or more, and is still more preferably 20% by mass or more, with respect to 100 g of water (20° C.).

As the hydrophilic acrylic polymer (B), for example, a polymer of a hydrophilic acrylic monomer (b1) can be used. Note that, "hydrophilicity" of the hydrophilic acrylic monomer (b1) means affinity with water, and specifically, means that the solubility is preferably 5% by mass or more, is more preferably 10% by mass or more, and is still more preferably 20% by mass or more, with respect to 100 g of water (20° C.).

Examples of the hydrophilic acrylic monomer (b1) include an acrylic monomer (b1-1) having an amide group, an acrylic monomer (b1-2) having an oxyethylene group, an acrylic monomer having a sulfonic acid group, an acrylic monomer having a quaternary ammonium group, an acrylic monomer having a carboxyl group, an acrylic monomer having an amino group, an acrylic monomer having a cyano group, an acrylic monomer having a hydroxyl group, an acrylic monomer having an imide group, and an acrylic monomer having a methoxy group.

Examples of the acrylic monomer (b1-1) having an amide group include (meth)acrylamide, (meth)acryloyl morpholine, N-methylol (meth)acrylamide, N-methoxyethyl (meth)acrylamide, N,N-dimethyl acrylamide, N,N-diethyl acrylamide, and N-isopropyl acrylamide. These monomers may be used alone, or two or more kinds thereof may be used in combination.

Examples of the acrylic monomer having an oxyethylene group (b1-2) include polyethylene glycol (meth)acrylate and methoxy polyethylene glycol (meth)acrylate. These monomers may be used alone, or two or more kinds thereof may be used in combination.

Examples of the acrylic monomer having a sulfonic acid group include sodium sulfopropyl (meth)acrylate, sodium 2-sulfoethyl (meth)acrylate, and sodium 2-acrylamido-2-methyl propanesulfonate. These monomers may be used alone, or two or more kinds thereof may be used in combination.

Examples of the acrylic monomer having a quaternary ammonium group include tetrabutyl ammonium (meth)acrylate and trimethyl benzyl ammonium (meth)acrylate. These monomers may be used alone, or two or more kinds thereof may be used in combination.

Examples of the acrylic monomer having a carboxyl group include (meth)acrylic acid, propyl (meth)acrylic acid, isopropyl (meth)acrylic acid, crotonic acid, and fumaric acid. These monomers may be used alone, or two or more kinds thereof may be used in combination.

Examples of the acrylic monomer having an amino group include dimethyl aminoethyl (meth)acrylate, diethyl aminoethyl (meth)acrylate, N-tert-butyl aminoethyl (meth)acrylate, and methacryloxyethyl trimethyl ammonium chloride (meth)acrylate. These monomers may be used alone, or two or more kinds thereof may be used in combination.

Examples of the acrylic monomer having a cyano group include acrylonitrile, cyanomethyl acrylate, 2-cyanoethyl acrylate, cyanopropyl acrylate, 1-cyanomethyl ethyl acrylate, 2-cyanopropyl acrylate, 1-cyanocyclopropyl acrylate, 1-cyano cycloheptyl acrylate, 1, 1-dicyanoethyl acrylate, 2-cyanophenyl acrylate, 3-cyanophenyl acrylate, 4-cyanophenyl acrylate, 3-cyanobenzyl acrylate, and 4-cyanobenzyl acrylate. These monomers may be used alone, or two or more kinds thereof may be used in combination.

Examples of the acrylic monomer having a hydroxyl group include 2-hydroxybethyl (meth)acrylate, 2-hydroxypropyl (meth)acrylate, 2-hydroxybutyl (meth)acrylate, 4-hydroxybutyl (meth)acrylate, and glycerol mono(meth)acrylate. These monomers may be used alone, or two or more kinds thereof may be used in combination.

Examples of the acrylic monomer having an imide group include (meth)acrylic imide, N-methylol maleimide, N-hydroxyethyl maleimide, N-glycidyl maleimide, N-4-chloromethyl phenyl maleimide, and N-acetoxyethyl maleimide. These monomers may be used alone, or two or more kinds thereof may be used in combination.

Examples of the acrylic monomer having a methoxy group include 3-methoxybutyl (meth)acrylate, 2-methoxyethyl (meth)acrylate, 3-methoxypropyl (meth)acrylate, and 2-methoxybutyl (meth)acrylate. These monomers may be used alone, or two or more kinds thereof may be used in combination.

As the hydrophilic acrylic monomer (b1), among the above monomers, an amide group having a highly hydrophilic alkyl-substituted nitrogen atom and polyoxyethylene glycol are contained as side chains, and thus the excellent moisture permeability and the water swelling resistance can be obtained. Therefore, it is preferable to contain an acrylic monomer (b1-1) having an amide group and an acrylic monomer (b1-2) having an oxyethylene group. The content of the acrylic monomer (b1-1) having an amide group and the acrylic monomer (b1-2) having an oxyethylene group is preferably 70% by mass or more, is more preferably 80% by mass or more, and is still more preferably 90% by mass or more in the hydrophilic acrylic monomer (b1).

As a polymerization ratio (molar ratio) of the acrylic monomer (b1-1) having an amide group to the acrylic monomer (b1-2) having an oxyethylene group, the moisture permeability and the water swelling resistance can be maintained at a high level, and thus the polymerization ratio is preferably 90/10 to 50/50, is more preferable 85/15 to 70/30 from the viewpoint of obtaining more excellent water swelling resistance.

In addition, an average additional mole of the oxyethylene group of the acrylic monomer having an oxyethylene group (b1-2) is preferably 5 to 13 mole, and is more preferably 8 to 10 mole, from the viewpoint of the water swelling resistance.

In the case where the hydrophilic acrylic polymer (B) is produced, if necessary, a radical polymerizable monomer other than the hydrophilic acrylic monomer (b1) may be used in combination.

Examples of the radical polymerizable monomer include aliphatic (meth)acrylate such as methyl (meth)acrylate, ethyl (meth)acrylate, propyl (meth)acrylate, isopropyl (meth)acrylate, butyl (meth)acrylate, isobutyl (meth)acrylate, 2-ethyl butyl (meth)acrylate, n-pentyl (meth)acrylate, hexyl (meth)acrylate, 2-ethylhexyl (meth)acrylate, heptyl (meth)acrylate, n-octyl (meth)acrylate, nonyl (meth)acrylate, dodecyl (meth)acrylate, 3-methyl butyl (meth)acrylate, isooctyl (meth)acrylate, lauryl (meth)acrylate, tridecyl (meth)acrylate, stearyl (meth)acrylate, isostearyl (meth)acrylate, neopentyl (meth)acrylate, hexadecyl (meth)acrylate, and isoamyl (meth)acrylate; alicyclic (meth)acrylate such as isobornyl (meth)acrylate, cyclohexyl (meth)acrylate, and tetrahydrofurfuryl (meth)acrylate; aromatic (meth)acrylate such as benzyl (meth)acrylate, phenoxyethyl (meth)acrylate, and phenyl (meth)acrylate; and a vinyl compound such as styrene, α-methyl styrene, chlorostyrene, chloromethyl styrene, methyl vinyl ether, ethyl vinyl ether, and isobutyl vinyl ether. These monomers may be used alone, or two or more kinds thereof may be used in combination.

As a method for preparing the hydrophilic acrylic polymer (B), known radical polymerization can be used. Examples thereof includes a method of mixing and stirring the hydrophilic acrylic monomer (b1), a polymerization initiator, an organic solvent, and, if necessary, the radical polymerizable monomer at a temperature of, for example, 40° C. to 90° C., and allowing the radical polymerization to proceed, for example, for 1 to 10 hours.

Examples of the polymerization initiator include peroxide such as hydrogen peroxide, potassium persulfate, sodium persulfate, ammonium persulfate; organic peroxide such as benzoyl peroxide, t-butylperoxy-2-ethyl hexanoate, and cumene hydroperoxide; and an azo compound such as 2,2'-azobis-(2-aminodipropane) dihydrochloride, 2,2'-azobis-(N,N'-dimethylene isobutylamidine) dihydrochloride, azobisisobutyronitrile, 2,2'-azobis(2-methylbutyronitrile), and 2,2'-azobis(2,4-dimethyl valerate nitrile). These polymerization initiators may be used alone, or two or more kinds thereof may be used in combination. The amount of the polymerization initiator to be used is, for example, 0.001 to 5 parts by mass with respect to 100 parts by mass of the monomer which is a raw material of the hydrophilic acrylic polymer (B).

Examples of the organic solvent include toluene, ethyl acetate, butyl acetate, methyl ethyl ketone, methyl isobutyl ketone, N,N-dimethyl formamide, hexane, acetone, cyclohexanone, 3-pentanone, and acetonitrile. These organic solvents may be used alone, or two or more kinds thereof may be used in combination. The amount of the organic solvent to be used is, for example, 10 to 500 parts by mass with respect to 100 parts by mass of the monomer which is a raw material of the hydrophilic acrylic polymer (B).

The weight average molecular weight of the hydrophilic acrylic polymer (B) is preferably 10,000 to 100,000, and is more preferably 15,000 to 50,000, from the viewpoint of affinity with polyurethane (A). Note that, the weight average molecular weight of the hydrophilic acrylic polymer (B) is a value obtained by measuring by a gel permeation chromatography (GPC) method under the following conditions.

Measuring device: high speed GPC device ("HLC-8220GPC" manufactured by TOSOH CORPORATION)

Column: the following columns manufactured by TOSOH CORPORATION were used by being connected in series.

"TSKgel G5000" (7.8 mmI·D.×30 cm)×one
"TSKgel G4000" (7.8 mmI·D.×30 cm)×one
"TSKgel G3000" (7.8 mmI·D.×30 cm)×one
"TSKgel G2000" (7.8 mmI·D.×30 cm)×one
Detector: RI (differential refractometer)
Column temperature: 40° C.
Eluent: tetrahydrofuran (THF)
Flow rate: 1.0 mL/min
Injection volume: 100 µl (tetrahydrofuran solution having a sample concentration of 0.4% by mass)
Standard sample: a calibration curve was prepared using the following standard polystyrene.
(Standard Polystyrene)
"TSKgel standard polystyrene A-500" manufactured by TOSOH CORPORATION
"TSKgel standard polystyrene A-1000" manufactured by TOSOH CORPORATION
"TSKgel standard polystyrene A-2500" manufactured by TOSOH CORPORATION
"TSKgel standard polystyrene A-5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION From the viewpoint of obtaining excellent moisture permeability and water swelling resistance, and not adversely affecting other physical properties such as durability, the content of the hydrophilic acrylic polymer (B) is preferably 10 to 50 parts by mass, and from the viewpoint of obtaining more excellent moisture permeability and water swelling resistance, it is more preferably 20 to 40 parts by mass, with respect to 100 parts by mass of the polyurethane (A).

As the polyurethane (A), a reaction product of the polyol (a-1) and the polyisocyanate (a-2) can be used. In the present invention, since the more excellent moisture permeability and water swelling resistance are applied to the hydrophilic acrylic polymer (B), in accordance with other physical properties such as durability, the polyol (a-1) and the polyisocyanate (a-2) can be freely designed.

Examples of the polyol (a-1) include polyether polyol, polycarbonate polyol, polyester polyol, polyacryl polyol, and polybutadiene polyol. These polyols may be used alone, or two or more kinds thereof may be used in combination.

The number average molecular weight of the polyol (a-1) can be appropriately determined in a range of 500 to 8,000 in accordance with the intended physical properties. Note that, the number average molecular weight of the polyol (a-1) indicates a value obtained by the same measuring method as that of the weight average molecular weight of the hydrophilic acrylic polymer (B).

A chain extender having the number average molecular weight of 50 to 450 may be used in combination with the polyol (a-1), if necessary. Note that, the number average molecular weight of the chain extender indicates a value obtained by the same measuring method as that of the weight average molecular weight of the hydrophilic acrylic polymer (B).

Examples of the chain extender include a chain extender having a hydroxyl group such as ethylene glycol, diethylene glycol, triethylene glycol, propylene glycol, 1,3-propanediol, 1,3-butanediol, 1,4-butanediol, hexamethylene glycol, sucrose, methylene glycol, glycerin, sorbito, bisphenol A, 4,4'-dihydroxydiphenyl, 4,4'-dihydroxydiphenyl ether, 4,4'-dihydroxydiphenyl sulfone, hydrogenated bisphenol A, and hydroquinone; and a chain extender having an amino group such as ethylenediamine, 1,2-propanediamine, 1,6-hexamethylenediamine, piperazine, 2-methyl piperazine, 2,5-dimethyl piperazine, isophoronediamine, 4,4'-dicyclohexyl methanediamine, 3,3'-dimethyl-4,4'-dicyclohexyl methanediamine, 1,2-cyclohexanediamine, 1,4-cyclohexanediamine, aminoethyl ethanolamine, hydrazine, diethylenetriamine, and triethylenetetramine. These chain extenders may be used alone, or two or more kinds thereof may be used in combination.

The amount of the chain extender to be used is preferably, for example, 0.1 to 30 parts by mass with respect to 100 parts by mass of the polyol (a-1), from the viewpoint of mechanical strength and texture.

Examples of the polyisocyanate (a-2) include aromatic polyisocyanate such as 1,3-phenylene diisocyanate, 1,4-phenylene diisocyanate, 1-methyl-2,4-phenylene diisocyanate, 1-methyl-2,6-phenylene diisocyanate, 1-methyl-2,5-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethyl benzene diisocyanate, diisopropyl benzene diisocyanate, 1-methyl-3,5-diethyl benzene diisocyanate, 3-methyl-1,5-diethyl benzene-2,4-diisocyanate, 1,3,5-triethyl benzene-2,4-diisocyanate, naphthalene-1,4-diisocyanate, naphthalene-1,5-diisocyanate, 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethyl biphenyl-4,4'-diisocyanate, 4,4'-diphenyl methane diisocyanate, 2,2'-diphenyl methane diisocyanate, and diphenyl methane-2,4-diisocyanate; and aliphatic or alicyclic polyisocyanate such as tetramethylene diisocyanate, 1,6-hexamethylene diisocyanate, dodecamethylene diisocyanate, trimethyl hexamethylene diisocyanate, 1,3-cyclopentylene diisocyanate, 1,3-cyclohexylene diisocyanate, 1,4-cyclohexylene diisocyanate, 1,3-di(isocyanatomethyl) cyclohexane, lysine diisocyanate, isophorone diisocyanate, 4,4'-dicyclohexyl methane diisocyanate, 2,4'-dicyclohexyl methane diisocyanate, 2,2'-dicyclohexyl methane diisocyanate, and 3,3'-dimethyl-4,4'-dicyclohexylmethane diisocyanate. These polyisocyanates may be used alone, or two or more kinds thereof may be used in combination.

As a method of preparing the polyurethane (A), for example, a preparing method of charging a polyol (a-1), the polyisocyanate (a-2), and if necessary, the chain extender, and performing urethanization reaction can be applied. These reactions are performed, for example, at a temperature of 50° C. to 100° C. for 3 to 10 hours. In addition, the urethanization reaction may be performed in an organic solvent.

Examples of the organic solvent include N,N-dimethyl formamide, N,N-dimethyl acetamide, N-methyl-2-pyrrolidone, methyl ethyl ketone, methyl-n-propyl ketone, acetone, methyl isobutyl ketone, methyl formate, ethyl formate, propyl formate, methyl acetate, ethyl acetate, isopropyl acetate, isobutyl acetate, secondary butyl acetate, methanol, ethanol, isopropyl alcohol, and butanol. These organic solvents may be used alone, or two or more kinds thereof may be used in combination.

The molar ratio [isocyanate group/hydroxyl group and amino group] of the total of the hydroxyl group and the amino group of the polyol (a-1) and the chain extender (a3) to the isocyanate group of the polyisocyanate (a-2) is preferably 0.8 to 1.2, and is more preferably 0.9 to 1.1 from the viewpoint of preparation stability and mechanical strength.

The weight average molecular weight of the polyurethane (A) can be appropriately determined in a range of 500 to 500,000 in accordance with the intended physical properties. Note that, the weight average molecular weight of the polyurethane (A) indicates a value obtained by the same measuring method as that of the weight average molecular weight of the hydrophilic acrylic polymer (B).

The composition for forming the moisture-permeable film of the present invention can be prepared, for example, by mixing the polyurethane (A) and the hydrophilic acrylic polymer (B).

The composition for forming the moisture-permeable film of the present invention contains the polyurethane (A) and the hydrophilic acrylic polymer (B) as essential components, but other additives may be used in combination, if necessary.

Examples of the other additives include a pigment, a flame retardant, a plasticizer, a softener, a stabilizer, a wax, a defoaming agent, a dispersant, a penetrating agent, a surfactant, a filler, a fungicide, an antibacterial agent, an ultraviolet absorber, an antioxidant, a weathering stabilizer, a fluorescent whitening agent, an antioxidant, and a thickener. These additives may be used alone, or two or more kinds thereof may be used in combination.

Next, a method of forming a moisture-permeable film with the above-described composition will be described.

Examples of the method of forming the moisture-permeable film include a method of coating the base material with the above-described composition, and drying at a temperature of 40° C. to 150° C. for 1 to 30 minutes for example.

Examples of the base material with which the composition is coated include a base material made of a nonwoven fabric, a woven fabric, a knitted material; a resin film; and paper. Examples of the constituent of the base material include a chemical fiber such as a polyester fiber, a nylon fiber, an acrylic fiber, a polyurethane fiber, an acetate fiber, a rayon fiber, and polylactic acid fiber; cotton, hemp, silk, wool, and blended fibers thereof. In the case where a base material made of a nonwoven fabric, a woven fabric, or a knitted material is used as the base material, a state in which the dried material of the composition is impregnated in the base material occurs, and in the present invention the material formed in such a state is also called a film.

On the surface of the base material, a treatment such as antistatic processing, release treatment processing, water repellent processing, water absorption processing, antibacterial deodorizing processing, bacterium processing, and UV blocking processing may be applied as necessary.

Examples of the method of coating the surface of the base material with the composition include a gravure coater method, a knife coater method, a pipe coater method, and a comma coater method.

The thickness of the moisture-permeable film can be determined according to intended use, and is, for example, 0.01 to 10 mm.

As described above, the moisture-permeable film of the present invention is excellent in the moisture permeability and the water swelling resistance. Accordingly, the moisture-permeable film of the present invention can be preferably used as the moisture-permeable film used in manufacturing moisture-permeable waterproof cloth for clothing, medical, and hygiene; and synthetic leather.

As the method of producing the moisture-permeable waterproof cloth in the case where the moisture-permeable film of the present invention is used in producing the moisture-permeable waterproof cloth, for example, a method of attaching the moisture-permeable film to a fabric using a known adhesive agent; and a method of directly coating the cloth with composition and drying the coated cloth can be used. Examples of the cloth include a chemical fiber such as a polyester fiber, a nylon fiber, an acrylic fiber, a polyurethane fiber, an acetate fiber, a rayon fiber, and polylactic acid fiber; cotton, hemp, silk, wool, and blended fibers thereof. In the case where the cloth is directly coated with the above-described composition, a state in which the dried material of the composition is impregnated in the cloth occurs, and in the present invention the material formed in such a state is also called a film.

As the method of producing the synthetic leather in the case where the moisture-permeable film of the present invention is used in producing the synthetic leather, for example, a method of coating a release paper with the composition and drying the release paper, and then attaching the resultant adhered to a base cloth on a moisture-permeable film using a known adhesive can be used. Examples of the base cloth include a chemical fiber such as a polyester fiber, a nylon fiber, an acrylic fiber, a polyurethane fiber, an acetate fiber, a rayon fiber, and polylactic acid fiber; cotton, hemp, silk, wool, and blended fibers thereof.

EXAMPLES

Hereinafter, the present invention will be described in more detail by way of examples.

Synthesis Example 1

<Synthesis of Hydrophilic Acrylic Polymer (B-1)>

N,N-dimethyl formamide was charged into a reactor equipped with a stirrer, a thermometer, and a nitrogen gas inlet tube, then, a mixture (molar ratio=85/15) of N,N-dimethyl acrylamide/methoxy polyethylene glycol acrylate ("AM-90G" prepared by Shin-Nakamura Chemical Co., Ltd., the number of average additional moles of an oxyethylene group is 9 mole), 0.1% by mass of azo-based polymerization initiator "V-59" prepared by Wako Pure Chemical Industries, Ltd., and 50% by mass of N,N-dimethyl formamide solution with respect to the mixture were dropped into the reactor at 80° C. over four hours, and radical polymerization was performed. The weight average molecular weight of the obtained hydrophilic acrylic polymer (B-1) was 20,000, and the solid content was 50% by mass.

Synthesis Example 2

<Synthesis of Hydrophilic Acrylic Polymer (B-2)>

N,N-dimethyl formamide was charged into a reactor equipped with a stirrer, a thermometer, and a nitrogen gas inlet tube, then, a mixture (molar ratio=50/50) of N,N-dimethyl acrylamide/methoxy polyethylene glycol acrylate ("AM-90G" prepared by Shin-Nakamura Chemical Co., Ltd., the number of average additional moles of an oxyethylene group is 9 mole), 0.1% by mass of azo-based polymerization initiator "V-59" prepared by Wako Pure Chemical Industries, Ltd., and 50% by mass of N,N-dimethyl formamide solution with respect to the mixture were dropped into the reactor at 80° C. over four hours, and radical polymerization was performed. The weight average molecular weight of the obtained hydrophilic acrylic polymer (B-2) was 20,000, and the solid content was 50% by mass.

Synthesis Example 3

<Synthesis of Hydrophilic Acrylic Polymer (B-3)>

N,N-dimethyl formamide was charged into a reactor equipped with a stirrer, a thermometer, and a nitrogen gas inlet tube, then, a mixture (molar ratio=85/15) of N,N-diethyl acrylamide/methoxy polyethylene glycol acrylate ("AM-90G" prepared by Shin-Nakamura Chemical Co., Ltd., the number of average additional moles of an oxyethylene group is 9 mole), 0.1% by mass of azo-based polymerization initiator "V-59" prepared by Wako Pure Chemical Industries, Ltd., and 50% by mass of N,N-dimethyl formamide solution with respect to the mixture were dropped into the reactor at 80° C. over four hours, and radical polymerization was performed. The weight average molecular weight of the obtained hydrophilic acrylic polymer (B-3) was 20,000, and the solid content was 50% by mass.

Synthesis Example 4

<Synthesis of Hydrophilic Acrylic Polymer (B-4)>

N,N-dimethyl formamide was charged into a reactor equipped with a stirrer, a thermometer, and a nitrogen gas inlet tube, then, a mixture (molar ratio=85/15) of N,N-dimethyl acrylamide/methoxy polyethylene glycol acrylate ("AM-130G" prepared by Shin-Nakamura Chemical Co., Ltd., the number of average additional moles of an oxyethylene group is 13 mole), 0.1% by mass of azo-based polymerization initiator "V-59" prepared by Wako Pure Chemical Industries, Ltd., and 50% by mass of N,N-dimethyl formamide solution with respect to the mixture were dropped into the reactor at 80° C. over four hours, and radical polymerization was performed. The weight average molecular weight of the obtained hydrophilic acrylic polymer (B-4) was 20,000, and the solid content was 50% by mass.

Example 1

A polyester-based polyurethane ("CRISVON MP-856" prepared by DIC Corporation) was mixed with a hydrophilic acrylic polymer (B-1) in a solid content ratio of 30% by mass with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Example 2

A composition and a moisture-permeable film were obtained in the same manner as in Example 1 except for using polyether-based polyurethane ("CRISVON 1846EL" prepared by DIC Corporation) instead of polyester-based polyurethane ("CRISVON MP-856" prepared by DIC Corporation).

Example 3

A composition and a moisture-permeable film were obtained in the same manner as in Example 1 except for using polycarbonate-based polyurethane ("CRISVON S-705" prepared by DIC Corporation) instead of polyester-based polyurethane ("CRISVON MP-856" prepared by DIC Corporation).

Example 4

A polyester-based polyurethane ("CRISVON MP-856" prepared by DIC Corporation) was mixed with a hydrophilic acrylic polymer (B-1) in a solid content ratio of 15% by mass with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Example 5

A polyester-based polyurethane ("CRISVON MP-856" prepared by DIC Corporation) was mixed with a hydrophilic acrylic polymer (B-1) in a solid content ratio of 50% by mass was mixed with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Example 6

A polyester-based polyurethane ("CRISVON MP-856" prepared by DIC Corporation) was mixed with a hydrophilic acrylic polymer (B-2) in a solid content ratio of 30% by mass with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Example 7

A polyester-based polyurethane ("CRISVON MP-856" prepared by DIC Corporation) was mixed with a hydrophilic acrylic polymer (B-3) in a solid content ratio of 30% by mass was mixed with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Example 8

A polyester-based polyurethane ("CRISVON MP-856" prepared by DIC Corporation) was mixed with a hydrophilic acrylic polymer (B-4) in a solid content ratio of 30% by mass was mixed with respect to the polyester-based polyurethane, thereby obtaining a composition.

100 parts by mass of the obtained composition was diluted with 30 parts by mass of N,N-dimethyl formamide, release paper was coated with the diluted composition such that the thickness was 15 μm as measured after drying, and the resultant was dried in a drier at 70° C. for two minutes and then dried at 120° C. for two minutes, thereby obtaining a moisture-permeable film.

Comparative Example 1

Release paper was coated with polyoxyethylene glycol-based polyurethane ("CRISVON S-525", prepared by DIC Corporation) such that the thickness was 15 μm as measured after drying, and the resultant was dried in a drier at 70° C. for two minutes and then dried at 120° C. for two minutes, thereby obtaining a moisture-permeable film.

Comparative Example 2

Release paper was coated with polyester-based polyurethane ("CRISVON MP-856" prepared by DIC Corporation) such that the thickness was 15 μm as measured after drying, and the resultant was dried in a drier at 70° C. for two minutes and then dried at 120° C. for two minutes, thereby obtaining a film.

Comparative Example 3

Release paper was coated with polyether-based polyurethane ("CRISVON 1846EL" prepared by DIC Corporation) such that the thickness was 15 μm as measured after drying, and the resultant was dried in a drier at 70° C. for two minutes and then dried at 120° C. for two minutes, thereby obtaining a film.

Comparative Example 4

Release paper was coated with polycarbonate-based polyurethane ("CRISVON S-705" prepared by DIC Corporation) such that the thickness was 15 μm as measured after drying, and the resultant was dried in a drier at 70° C. for two minutes and then dried at 120° C. for two minutes, thereby obtaining a film.

[Evaluation Method of Moisture Permeability]

The moisture permeability ($g/m^2/24$ h) of the moisture-permeable film and the film obtained in Examples and Comparative Examples was measured based on JISL 1099: 2012 B-1 method (potassium acetate method).

[Evaluation Method of Water Swelling Resistance]

The moisture-permeable films and the films obtained in Examples and Comparative Examples were cut into 2 cm (length)×5 cm (width) as test pieces. The obtained test pieces were immersed in ion-exchanged water at 25° C. for one hour, the length of the taken out moisture-permeable film and film in the transverse direction was measured, and the swelling ratio (%) was calculated by the following Expression (1).

$$\text{Swelling ratio (\%)} = \text{length (cm) of moisture-permeable film and film after immersion} - 5 \text{ (cm)}/5 \text{ (cm)} \times 100 \quad (1)$$

TABLE 1

| Table 1 | Example 1 | Example 2 | Example 3 | Example 4 | Example 5 | Example 6 |
|---|---|---|---|---|---|---|
| Polyurethane (A) | PEs-based Pu | PEt-based Pu | PC-based Pu | PEs-based Pu | PEs-based Pu | PEs-based Pu |
| Hydrophilic acrylic polymer (B) | (B-1) | (B-1) | (B-1) | (B-1) | (B-1) | (B-2) |
| (1) | DMAA | DMAA | DMAA | DMAA | DMAA | DMAA |
| (2) | AM-90G | AM-90G | AM-90G | AM-90G | AM-90G | AM-90G |
| Molar ratio ((1)/(2)) | 85/15 | 85/15 | 85/15 | 85/15 | 85/15 | 50/50 |
| Use amount (part by mass) of (B) with respect to 100 parts by mass of (A) | 30 | 30 | 30 | 15 | 50 | 30 |
| Evaluation of moisture permeability | | | | | | |
| Moisture permeability ($g/m^2/24$ h) | 37,700 | 13,450 | 19,800 | 3080 | 104600 | 10300 |
| Evaluation of water swelling resistance | | | | | | |
| Swelling ratio (%) | 0 | 0 | 0 | 0 | 4 | 4 |

TABLE 2

| Table 2 | Example 7 | Example 8 | Comparative Example 1 | Comparative Example 2 | Comparative Example 3 | Comparative Example 4 |
|---|---|---|---|---|---|---|
| Polyurethane (A) | PEs-based Pu | PEs-based Pu | PEG-based Pu | PEs-based Pu | PEt-based Pu | PC-based Pu |
| Hydrophilic acrylic polymer (B) | (B-3) | (B-4) | | | | |

TABLE 2-continued

| Table 2 | Example 7 | Example 8 | Comparative Example 1 | Comparative Example 2 | Comparative Example 3 | Comparative Example 4 |
|---|---|---|---|---|---|---|
| (1) | DEAA | DMAA | | | | |
| (2) | AM-90G | AM-130G | | | | |
| Molar ratio ((1)/(2)) | 85/15 | 85/15 | | | | |
| Use amount (part by mass) of (B) with respect to 100 parts by mass of (A) | 30 | 30 | 0 | 0 | 0 | 0 |
| Evaluation of moisture permeability | | | | | | |
| Moisture permeability (g/m$^2$/24 h) | 20600 | 56900 | 105,000 | 2,150 | 2,800 | 350 |
| Evaluation of water swelling resistance | | | | | | |
| Swelling ratio (%) | 0 | 2 | 18 | 0 | 0 | 0 |

The abbreviations in Tables 1 and 2 will be explained.

"PEs-based Pu"; polyester-based polyurethane ("CRISVON MP-856" prepared by DIC Corporation)

"PEt-based Pu"; polyether-based polyurethane ("CRISVON 1846EL" prepared by DIC Corporation)

"PC-based Pu"; polycarbonate-based polyurethane ("CRISVON S-705" prepared by DIC Corporation)

"PEG-based Pu"; polyoxyethylene glycol-based polyurethane ("CRISVON S-525" prepared by DIC Corporation)

"DMAA"; N,N-dimethyl acrylamide

"DEAA"; N,N-diethyl acrylamide

"AM-90G"; methoxy polyethylene glycol acrylate ("AM-90G", prepared by Shin-Nakamura Chemical Co., Ltd.)

"AM-130G"; methoxy polyethylene glycol acrylate ("AM-130G", prepared by Shin-Nakamura Chemical Co., Ltd.)

It was found that Examples 1 to 8 which are the moisture-permeable films of the present invention were excellent in the moisture permeability and the water swelling resistance.

On the other hand, Comparative Example 1, which was the moisture-permeable film formed by a polyoxyethylene glycol-based polyurethane having moisture permeability, was inferior in the water swelling resistance.

Comparative Examples 2 to 4 were films formed of generally available polyurethanes prepared not using polyoxyethylene glycol, and were inferior in moisture permeability.

The invention claimed is:

1. A moisture-permeable film formed by a composition comprising polyurethane (A) and a hydrophilic acrylic polymer (B),
    wherein the hydrophilic acrylic polymer (B) is a polymer of a hydrophilic acrylic monomer (b1) containing an acrylic monomer (b1-1) having an amide group that has an alkyl-substituted nitrogen atom, and an acrylic monomer (b1-2) having an oxyethylene group, and
    wherein the oxyethylene group of the acrylic monomer (b1-2) comprises between 5 and 13 moles.

2. The moisture-permeable film according to claim 1, wherein a polymerization ratio (molar ratio) of the acrylic monomer (b1-1) having an amide group to the acrylic monomer (b1-2) having an oxyethylene group is 90/10 to 50/50.

3. The moisture-permeable film according to claim 1, wherein a content of the hydrophilic acrylic polymer (B) is 10 to 50 parts by mass with respect to 100 parts by mass of the polyurethane (A).

\* \* \* \* \*